(12) United States Patent
Berger et al.

(10) Patent No.: US 6,839,479 B2
(45) Date of Patent: Jan. 4, 2005

(54) OPTICAL SWITCH

(75) Inventors: Josef Berger, Los Altos, CA (US);
Gregory Miller, Foster City, CA (US);
Ronald Miles, Menlo Park, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 232 days.

(21) Appl. No.: 10/160,305

(22) Filed: May 29, 2002

(65) Prior Publication Data

US 2003/0223675 A1 Dec. 4, 2003

(51) Int. Cl.$^7$ ................................................ G02B 6/26

(52) U.S. Cl. .............................. 385/16; 385/14; 385/30

(58) Field of Search .......................... 385/14–24, 27–30

(56) References Cited

U.S. PATENT DOCUMENTS

| | | |
|---|---|---|
| RE16,767 E | 10/1927 | Jenkins |
| RE25,169 E | 5/1962 | Glenn |
| 4,257,053 A | 3/1981 | Gilbreath |
| 4,561,011 A | 12/1985 | Kohara et al. |
| 5,031,144 A | 7/1991 | Persky |
| 5,185,823 A | 2/1993 | Kaku et al. |
| D334,557 S | 4/1993 | Hunter et al. ............... D14/114 |
| D334,742 S | 4/1993 | Hunter et al. ............... D14/113 |
| 5,206,829 A | 4/1993 | Thakoor et al. |
| 5,216,278 A | 6/1993 | Lin et al. |
| D337,320 S | 7/1993 | Hunter et al. ............... D14/113 |
| 5,229,597 A | 7/1993 | Fukatsu |
| 5,315,429 A | 5/1994 | Abramov |
| 5,320,709 A | 6/1994 | Bowden et al. |
| 5,552,635 A | 9/1996 | Kim et al. |
| 5,832,148 A | 11/1998 | Yariv |
| 5,841,929 A | 11/1998 | Komatsu et al. |
| 6,012,336 A | 1/2000 | Eaton et al. |
| 6,096,656 A | 8/2000 | Matzke et al. |
| 6,154,305 A | 11/2000 | Dickensheets et al. |
| 6,249,381 B1 | 6/2001 | Suganuma |
| 6,282,213 B1 | 8/2001 | Gutin et al. |
| 6,313,901 B1 | 11/2001 | Cacharelis |
| 6,346,430 B1 | 2/2002 | Raj et al. |
| 6,418,152 B1 | 7/2002 | Davis |

(List continued on next page.)

FOREIGN PATENT DOCUMENTS

| | | |
|---|---|---|
| DE | 32 33 195 A1 | 3/1983 |
| DE | 43 23 799 A1 | 1/1994 |
| DE | 197 23 618 A1 | 12/1997 |

OTHER PUBLICATIONS

R. W. Corrigan et al., "Calibration of a Scanned Linear Grating Light–Valve, Projection System for E–Cinema Applications", Silicon Light Machines, SID'99, San Jose, CA, 27 pgs, 1999.

R. W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/erpto/into.html, 35 pgs, Jun. 21, 1999.

(List continued on next page.)

*Primary Examiner*—Phan T. H. Palmer
(74) *Attorney, Agent, or Firm*—Okamoto & Benedicto LLP

(57) ABSTRACT

An optical switch comprises a substrate, first and second optical waveguide, and first and second conducting elements. The first optical waveguide is coupled to the substrate. The first conducting element is coupled to the first optical waveguide. The second optical waveguide is coupled to the substrate. The second conducting element is coupled to the second optical waveguide. In operation, a first electrical bias applied between the first and second conducting elements causes the first optical waveguide to not optically couple to the second optical waveguide. Further in operation, a second electric bias applied between the first and second conducting elements causes the first optical waveguide to optically couple to the second optical waveguide.

23 Claims, 10 Drawing Sheets

U.S. PATENT DOCUMENTS

| | | |
|---|---|---|
| 6,438,954 B1 | 8/2002 | Goetz et al. |
| 6,479,811 B1 | 11/2002 | Kruschwitz et al. |
| 6,569,717 B1 | 5/2003 | Murade |
| 6,658,176 B2 * | 12/2003 | Amantea .................... 385/16 |
| 2002/0131228 A1 | 9/2002 | Potter |
| 2002/0135708 A1 | 9/2002 | Murden et al. |
| 2002/0176151 A1 | 11/2002 | Moon et al. |
| 2002/0195418 A1 | 12/2002 | Kowarz et al. |
| 2002/0196492 A1 | 12/2002 | Trisnadi et al. |
| 2003/0056078 A1 | 3/2003 | Johansson et al. |

FOREIGN PATENT DOCUMENTS

| | | |
|---|---|---|
| DE | 197 51 716 A1 | 5/1998 |
| DE | 198 46 532 C1 | 5/2000 |
| EP | 0 089 044 A2 | 9/1983 |
| EP | 0 261 901 A2 | 3/1988 |
| EP | 0 314 437 A1 | 10/1988 |
| EP | 0 304 263 A2 | 2/1989 |
| EP | 0 306 308 A2 | 3/1989 |
| EP | 0 322 714 A2 | 7/1989 |
| EP | 0 627 644 A3 | 9/1990 |
| EP | 0 417 039 A1 | 3/1991 |
| EP | 0 423 513 A2 | 4/1991 |
| EP | 0 436 738 A1 | 7/1991 |
| EP | 0 458 316 A2 | 11/1991 |
| EP | 0 477 566 A2 | 4/1992 |
| EP | 0 488 326 A3 | 6/1992 |
| EP | 0 499 566 A2 | 8/1992 |
| EP | 0 528 646 A1 | 2/1993 |
| EP | 0 530 760 A2 | 3/1993 |
| EP | 0 550 189 A1 | 7/1993 |
| EP | 0 610 665 A1 | 8/1994 |
| EP | 0 627 644 A2 | 12/1994 |
| EP | 0 627 850 A1 | 12/1994 |
| EP | 0 643 314 A2 | 3/1995 |
| EP | 0 654 777 A1 | 5/1995 |
| EP | 0 658 868 A1 | 6/1995 |
| EP | 0 658 830 A1 | 12/1995 |
| EP | 0 689 078 A1 | 12/1995 |
| EP | 0 801 319 A1 | 10/1997 |
| EP | 0 851 492 A2 | 7/1998 |
| EP | 1 003 071 A2 | 5/2000 |
| EP | 1 014 143 A1 | 6/2000 |
| EP | 1 040 927 A2 | 10/2000 |
| GB | 2 117 564 A | 10/1983 |
| GB | 2 118 365 A | 10/1983 |
| GB | 2 266 385 A | 10/1993 |
| GB | 2 296 152 A | 6/1996 |
| GB | 2 319 424 A | 5/1998 |
| JP | 53-39068 | 4/1978 |
| JP | 55-111151 | 8/1980 |
| JP | 57-31166 | 2/1982 |
| JP | 57-210638 | 12/1982 |
| JP | 60-49638 | 3/1985 |
| JP | 60-94756 | 5/1985 |
| JP | 60-250639 | 12/1985 |
| JP | 61-142750 | 6/1986 |
| JP | 61-145838 | 7/1986 |
| JP | 63-234767 | 9/1988 |
| JP | 63-305323 | 12/1988 |
| JP | 1-155637 | 6/1989 |
| JP | 40-1155637 | 6/1989 |
| JP | 2219092 | 8/1990 |
| JP | 4-333015 | 11/1992 |
| JP | 7-281161 | 10/1995 |
| JP | 3288369 | 3/2002 |
| WO | WO 90/13913 | 11/1990 |
| WO | WO 92/12506 | 7/1992 |
| WO | WO 93/02269 | 2/1993 |
| WO | WO 93/09472 | 5/1993 |
| WO | WO 93/18428 | 9/1993 |
| WO | WO 93/22694 | 11/1993 |
| WO | WO 94/09473 | 4/1994 |
| WO | WO 94/29761 | 12/1994 |
| WO | WO 95/11473 | 4/1995 |
| WO | WO 96/02941 | 2/1996 |
| WO | WO 96/08031 | 3/1996 |
| WO | WO 96/41217 | 12/1996 |
| WO | WO 96/41224 | 12/1996 |
| WO | WO 97/22033 | 6/1997 |
| WO | WO 97/26569 | 7/1997 |
| WO | WO 98/05935 | 2/1998 |
| WO | WO 98/24240 | 6/1998 |
| WO | WO 98/41893 | 9/1998 |
| WO | WO 99/07146 | 2/1999 |
| WO | WO 99/12208 | 3/1999 |
| WO | WO 99/23520 | 5/1999 |
| WO | WO 99/34484 | 7/1999 |
| WO | WO 99/59335 | 11/1999 |
| WO | WO 99/63388 | 12/1999 |
| WO | WO 99/67671 | 12/1999 |
| WO | WO 00/04718 | 1/2000 |
| WO | WO 00/07225 | 2/2000 |
| WO | WO 01/04674 A1 | 1/2001 |
| WO | WO 01/006297 A3 | 1/2001 |
| WO | WO 01/57581 A3 | 8/2001 |
| WO | WO 02/025348 A3 | 3/2002 |
| WO | WO 02/31575 A2 | 4/2002 |
| WO | WO 02/058111 A2 | 7/2002 |
| WO | WO 02/065184 A3 | 8/2002 |
| WO | WO 02/073286 A2 | 9/2002 |
| WO | WO 02/084375 A1 | 10/2002 |
| WO | WO 02/084397 A3 | 10/2002 |
| WO | WO 03/001281 A1 | 1/2003 |
| WO | WO 03/001716 A1 | 1/2003 |
| WO | WO 03/012523 A1 | 2/2003 |
| WO | WO 03/016965 A1 | 2/2003 |
| WO | WO 03/023849 A1 | 3/2003 |
| WO | WO 03/025628 A2 | 3/2003 |

OTHER PUBLICATIONS

"Deep Sky Black,", Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Micromirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the–Loop Applications", IEEE Photonics Technology Letters, vol. 6, No. 9, Sep. 1994, pp. 1119–1121.

J. A. Walker et al., "Demonstration of a Gain Flattened Optical Amplifier with Micromechanical Equalizer Element", Lucent Technologies, pp. 13–14.

A. P. Payne et al., "Resonance Measurements of Stresses in $Al/SiN_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2," J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminium Mirror," Physical Electronics Laboratory, 1991 IEEE, pp. 547–550.

M. Parameswaran et al., "Commerical CMOS Fabricated Integrated Dynamic Thermal Scene Simulator," 1991 IEEE, pp. 29.4.1–29.4.4.

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M. Vugas et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5, 3,(1993), pp. 125–134.

Z. Parpia et al., "Modelling of CMOS Compatible High Voltage Device Structures," pp. 41–50.

Jon Gildemeister, "Xenon Difluoride Etching System," 1997, UC Berkeley MicroTabrication Manual Chapter 7.15, pp. 2–5.

W. Riethmuller et al., "A smart accelerometer with on–chip electronics fabricated by a commercial CMOS process," Sensors and Actuators A. 31, (1992), 121–124.

W. Gopel et al., "Sensors– A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D. F., Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the Al/SiO2 interfaces," 1985 American Institute of Physics, pp. 5256–52616.

Daniel L. Flamm et al., "XeF2 and F–Atom Reactions with Si: Their Significance for Plasma Etching," Solid State Technology, vol. 26, #4, 4/83, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 94, 63 pgs.

David Moser et al., "CMOS Flow Sensors," 1993 Physical Electronics Lab. Swiss Federal Institute of Tech, Zurich, Switerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P. C. Kunda et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, pp. 1146–1150.

Lingli Wang et al., "Speckle Reduction in Laser Projection Systems by Diffractive Optical Elements", XP–00754330, Applied Optics, Apr. 1, 1998, vol. 37, No. 10, pp. 1770–1775.

D. Rowe, "Laser Beam Scanning," SPIE, vol. 2088, Oct. 5, 1993, 18–26.

L. Hombeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp. 255–269, 1997.

Buhler et al., "Linear Array of Complementary Metal Oxide Semiconductor Double–Pass Metal Micromirrors," Optical Engineering, vol. 36, No. 5, pp. 1391–1398, May 1997.

Gani et al., "Variable Gratings for Optical Switching: Rigorous Electromagnetic Simulation and Design," Optical Engineering, vol. 38, No. 3, pp. 552–557, Mar. 1999.

R. Tepe, et al., "Viscoelastic Spatial Light Modulator with Active Matrix Addressing," Applied Optics, vol. 28, No. 22, New York, USA, pp.4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings*, Sensors and Actuators A, pp. 7–15, 1998.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997,pp. 377 of 379.

N. J. Frigo et al., "A Wavelength–Division Multiplexed Passive Optical Network on Cost–Shared Components", IEEE Photonics Technology Letters, vol. 6, No. 11, Nov. 1994, pp. 1365 of 1367.

M. S. Goodman et al., The LAMBDANET Multiwavelength Network: Architecture, Applications, and Demonstrations, IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13–16, 1994.

Sene et al., "Polysilicon micromechnical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Development of Digital MEMS–Based Display Technology Promises Improved Resolution, Contrast, and Speed, XP–000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", Received Jun. 4, 1976, p. 103–115.

Olga B. Spahn, et al., "High Optical Power Handling of Pop–Up Microelectromechanical Mirrors", Sandia National Laboratories, IEEE 2000, p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

R. Apte, "Grating Light Valves for High Resolution Displays", Solid State Sensors and Actuators Workshop, Ph D. Dissertation, Stanford University (Jun. 1994).

O. Solgaard, "Integrated Semiconductor Light Modulators for Fiber–Optic and Display Applications", Ph.D. Dissertation, Stanford University Feb., 1992.

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The International Conference on Solid–State Sensors and Actuators.

P. Alvelda, "High–Efficiency Color Mircodisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Farn et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

* cited by examiner

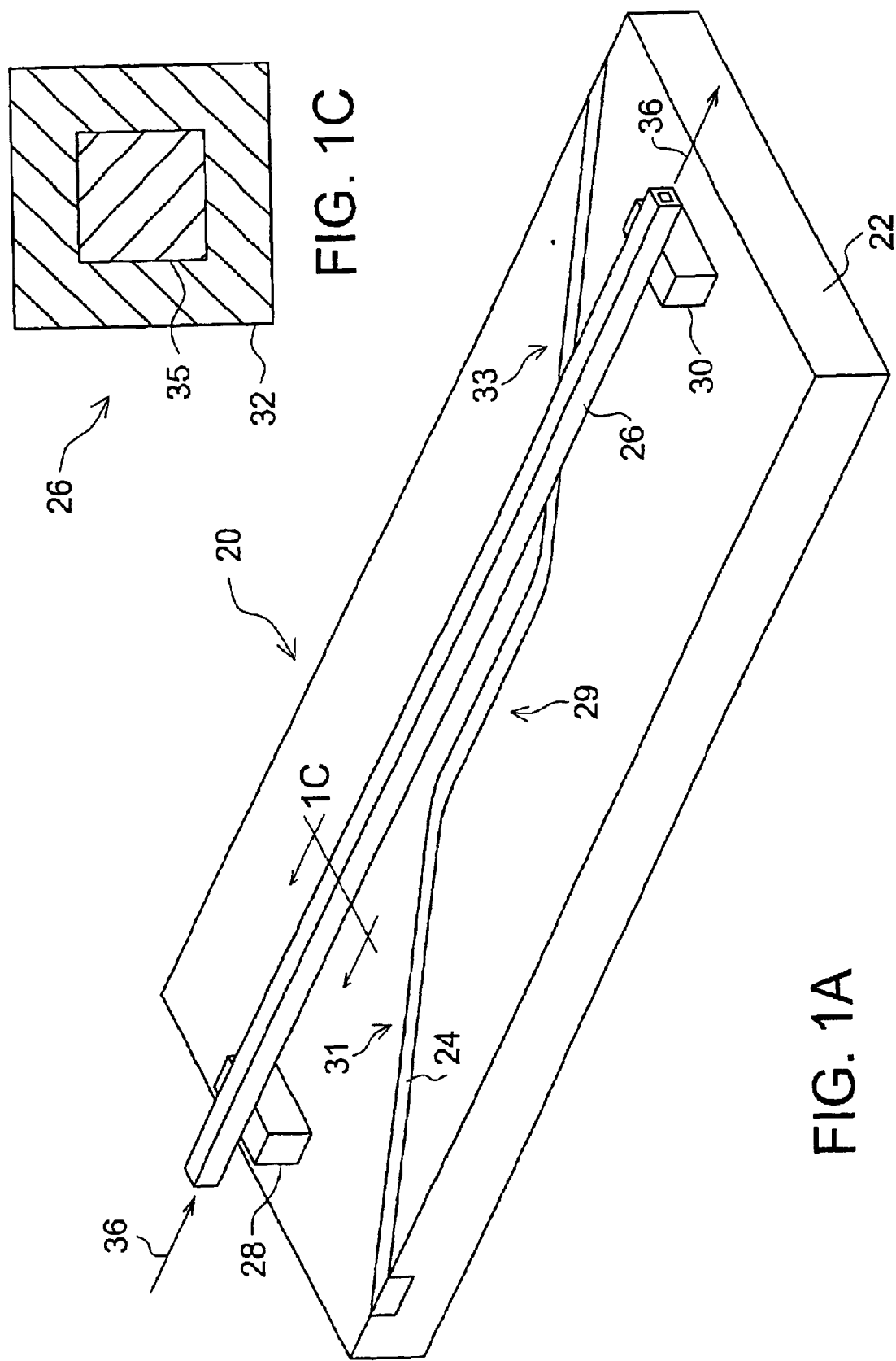

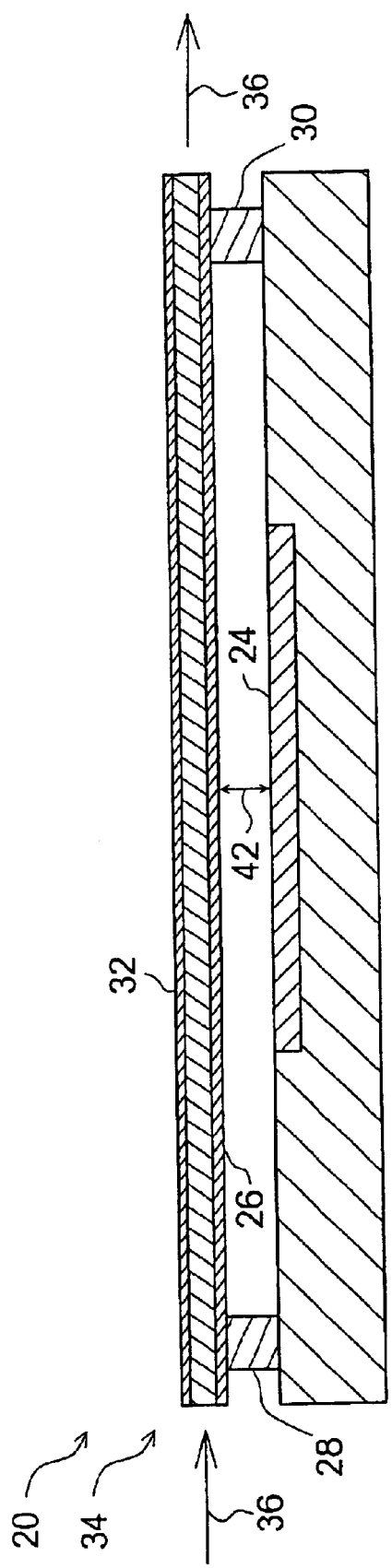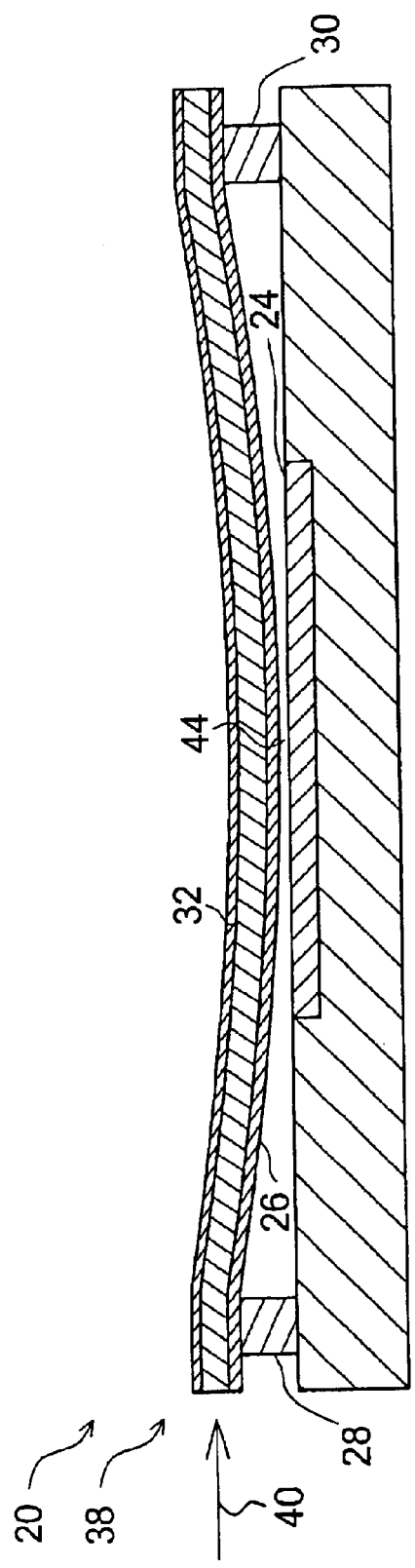
FIG. 2A
FIG. 2B

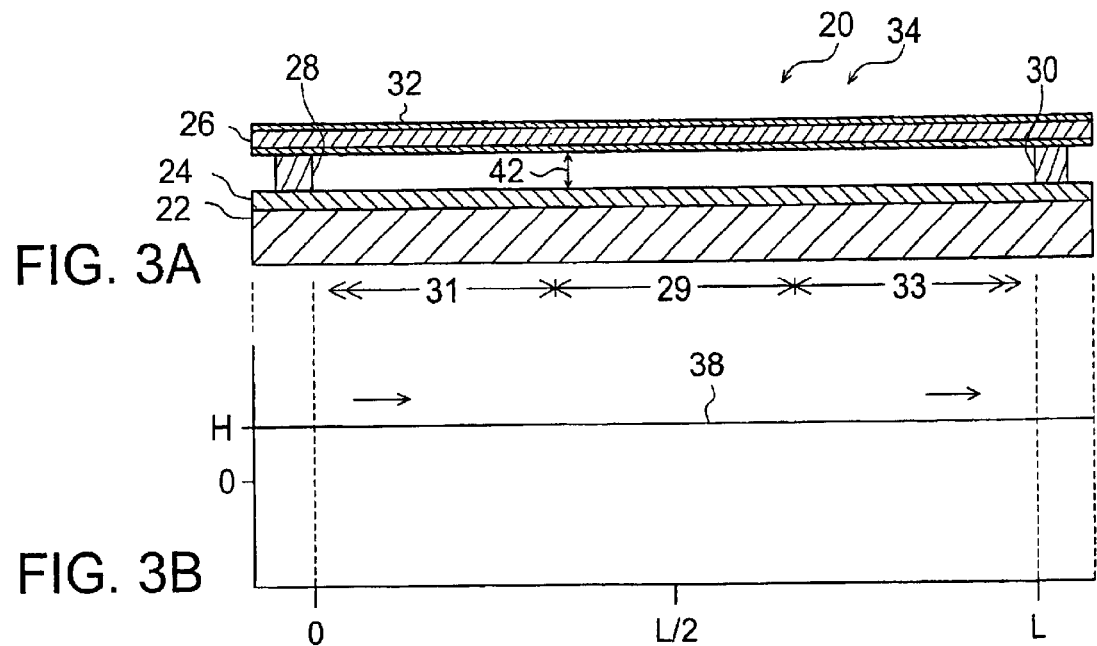
FIG. 3A
FIG. 3B
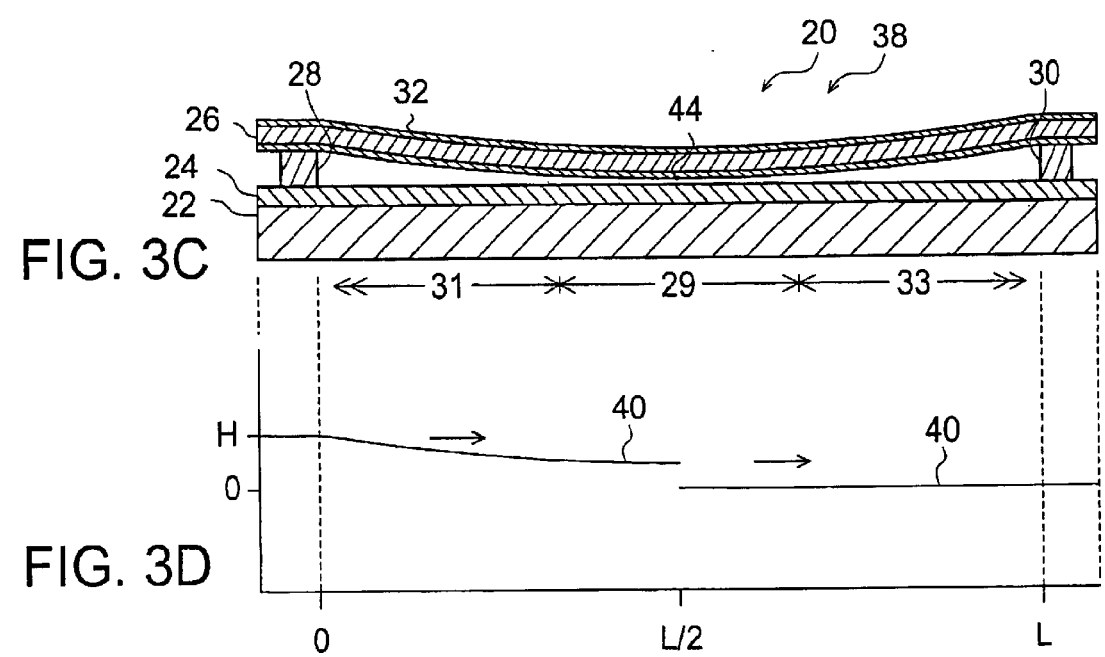
FIG. 3C
FIG. 3D

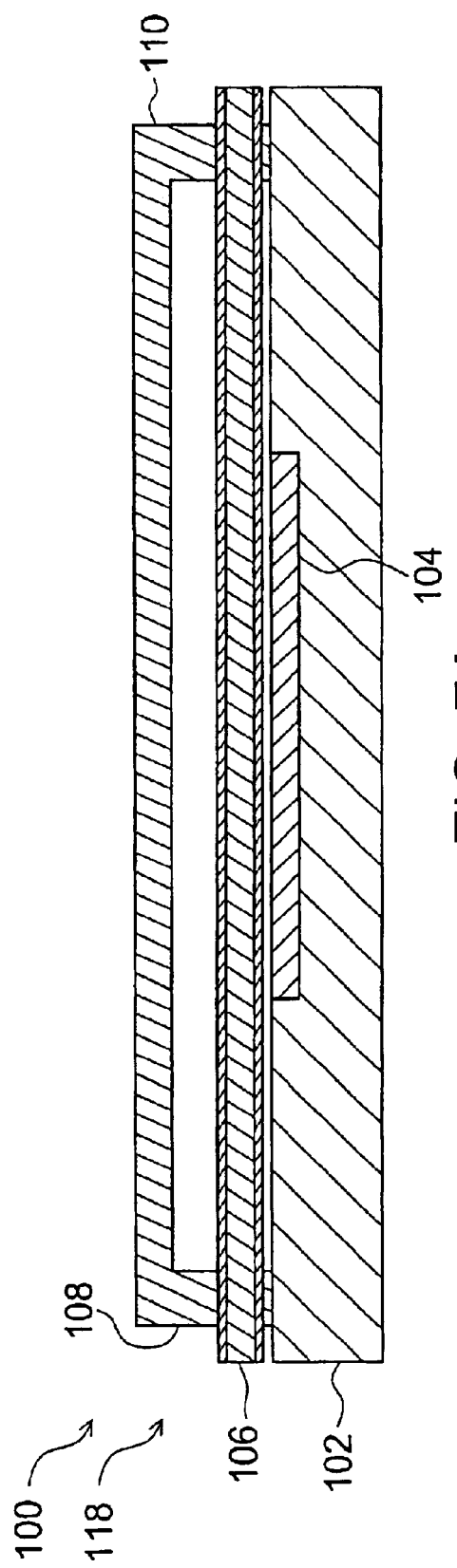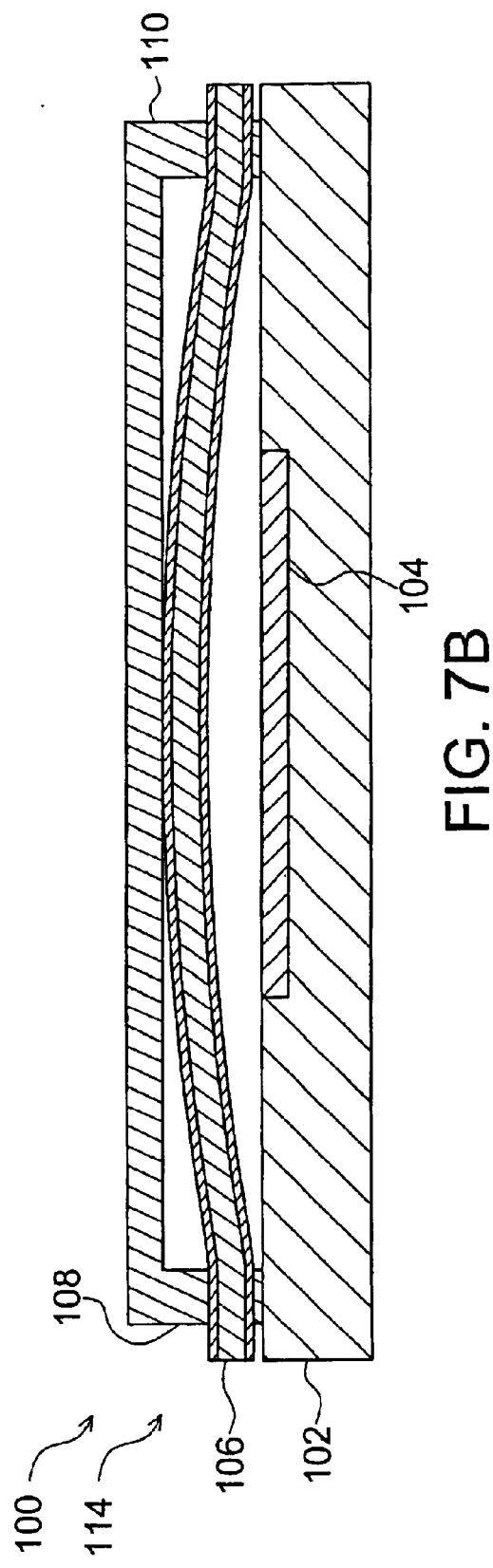

OPTICAL SWITCH

FIELD OF THE INVENTION

This invention relates to the field of optics. More particularly, this invention relates to the field of optics where there is a need to switch an optical signal from a first optical waveguide to a second optical waveguide.

BACKGROUND OF THE INVENTION

Optical communication uses an optical signal to transmit information. In the optical communication, an optical fiber forms a waveguide for the optical signal. Often, there is a need to switch the optical signal from a first optical waveguide to a second optical waveguide.

A first method of switching a first optical signal uses a spatial light modulator and a plurality of lenses to selectively switch the first optical signal between a plurality of optical fibers. In the first method, a first optical fiber emits the first optical signal and directs the first optical signal to the spatial light modulator via a first lens. The spatial light modulator selectively reflects the optical signal to a second or third optical fiber via a second or third lens, respectively.

Because the first method requires alignment of the optical fibers, the lenses, and the spatial light modulator, it is relatively expensive to fabricate and loss of alignment will cause loss of efficiency. Further, because the first method employs geometrical optics to switch the optical signal, it occupies a relatively large space. Moreover, the first method requires sophisticated and expensive control circuitry to maneuver the spatial light modulator.

A second method of switching an optical signal uses first through third optical waveguides and a mirror. In the second method, a first end of the first optical waveguide aligns with a second end of the second optical waveguide. A third end of the third optical waveguide lies skew to the first end of the first optical waveguide. In operation, the mirror occupies a location selected from first and second positions. In the first position, the mirror rests in a gap formed by the first end of the first optical waveguide and the second end of the second optical waveguide. When the mirror is in the first position, a second optical signal exits the first optical waveguide, reflects from the mirror, and couples into the third optical waveguide. In the second position, the mirror rests outside the gap between the first end of the first optical waveguide and the second end of the second optical waveguide. When the mirror is in the second position, the second optical signal exits the first optical waveguide and couples into the second optical waveguide.

Because the second optical signal refracts out of the first optical waveguide and into either the second or third optical waveguide, tight tolerances are required to ensure that the second optical signal couples into the appropriate waveguide. Further because the second optical signal refracts out of and into waveguides, a portion of the second optical signal is lost due to reflection leading to inefficiency. This is because each refraction also includes a reflection loss.

What is needed is a method of switching an optical signal from a first optical waveguide to a second optical waveguide that is efficient and economical.

SUMMARY OF THE INVENTION

The present invention is an optical switch. The optical switch comprises a substrate, first and second optical waveguides, and first and second conducting elements. The first optical waveguide is coupled to the substrate. The first conducting element is coupled to the first optical waveguide. The second optical waveguide is coupled to the substrate. The second conducting element is coupled to the second optical waveguide. In operation, a first electrical bias applied between the first and second conducting elements causes the first optical waveguide to not optically couple to the second optical waveguide. Further in operation, a second electric bias applied between the first and second conducting elements causes the first optical waveguide to optically couple to the second optical waveguide.

Preferably, the first conducting element comprises a first dopant within a first waveguide core of the first optical waveguide. Alternatively, the first conducting element comprises a first conducting material outside of the first waveguide core of the first optical waveguide. Preferably, the second conducting element comprises a second dopant within a second waveguide core of the second optical waveguide. Alternatively, the second conducting element comprises a second conducting material outside of the second waveguide core of the second optical waveguide.

BRIEF DESCRIPTION OF THE DRAWINGS

FIGS. 1A and 1B illustrate the preferred optical switch of the present invention.

FIG. 1C illustrates the preferred optical switch of the present invention in a switched state.

FIGS. 2A and 2B further illustrate the preferred optical switch of the present invention.

FIG. 3A illustrates lower and upper optical waveguides of the preferred optical switch of the present invention in a non-switched state.

FIG. 3B graphically illustrates a first optical signal traveling through the preferred optical switch of the present invention in the non-switched state.

FIG. 3C illustrates the lower and upper optical waveguides of the preferred optical switch of the present invention in a switched state.

FIG. 3D graphically illustrates a second optical signal traveling through the preferred optical switch of the present invention in the switched state.

FIGS. 7A and 7B illustrate a second alternative optical switch of the present invention.

DETAILED DESCRIPTION OF THE PREFERRED EMBODIMENT

Figure 1B:
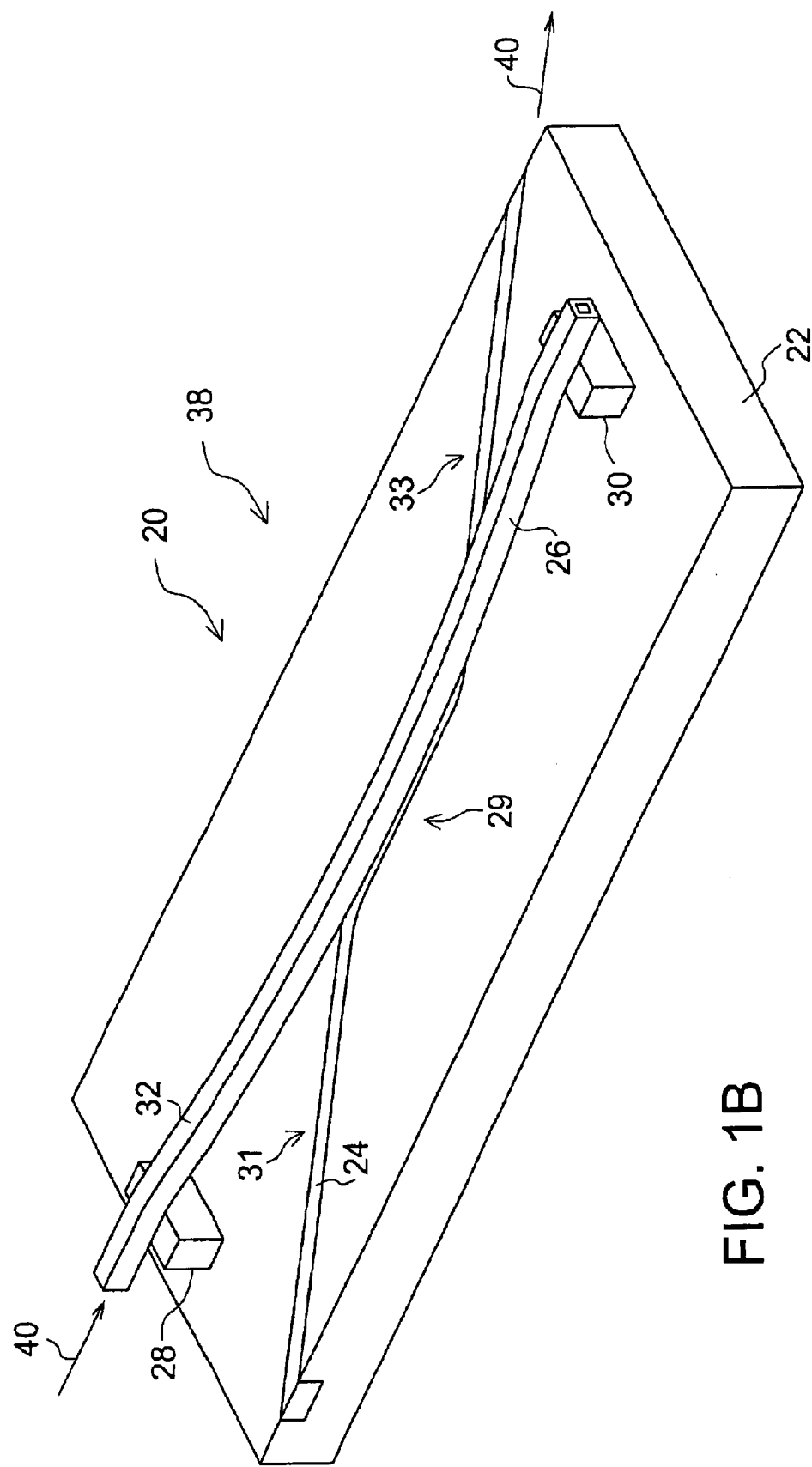

The preferred optical switch of the present invention is illustrated in FIGS. 1A and 1B. The preferred optical switch 20 comprises a substrate 22, a lower optical waveguide 24, an upper optical waveguide 26, and first and second support structures, 28 and 30. The lower and upper optical waveguide, 24 and 26, are each formed by a waveguide material having an index of refraction higher than indexes of refraction for surrounding materials. Preferably, the lower optical waveguide is embedded in the substrate 22. Alternatively, the lower optical waveguide 22 is a ridge waveguide.

Preferably, the lower and upper optical waveguides are parallel along a coupling length 29. Preferably, the lower optical waveguide 24 lies skew to the upper optical waveguide 26 along input and output lengths, 31 and 33.

A cross section of the upper optical waveguide 26 is illustrated in FIG. 1C. Preferably, the upper optical waveguide 26 comprises an upper waveguide cladding 32 surrounding an upper waveguide core 35. Preferably, the upper waveguide core 35 is formed by lightly doping a center of the upper optical waveguide 26. This results in a core index of refraction that is greater than a cladding index of refraction. The upper waveguide cladding 32 couples the upper waveguide 26 to the first and second support structures, 28 and 30. The first and second support structures, 28 and 30, couple the upper optical waveguide 26 to the substrate 22.

As illustrated in FIG. 1A, the preferred optical switch 20 is in a non-switched state 34. In the non-switched state 34, a first optical signal 36 enters and exits the preferred optical switch 20 via the upper optical waveguide 26. As illustrated in FIG. 1C, the preferred optical switch is in a switched state 38. In the switched state 38, a second optical signal 40 enters the preferred optical switch 20 via the upper optical waveguide 26 and exits the preferred optical switch 20 via the lower optical waveguide 24.

Preferably, the preferred optical switch 20 operates over a broad wavelength band. Alternatively, the preferred optical switch 20 switches a specific wavelength, which is accomplished by controlling a gap between the lower and upper optical waveguides, 24 and 26. Further alternatively, the preferred optical switch 20 switches the specific wavelength employing a periodic corrugation on the lower optical waveguide 24, employing the periodic corrugation on the upper optical waveguide 26, or employing the periodic corrugation on both the lower and upper optical waveguides, 24 and 26.

It will be readily apparent to one skilled in the art that in the non-switched state 34 a third optical signal (not shown) entering the preferred optical switch 20 via the lower optical waveguide 24 exits the preferred optical switch 20 via the lower optical waveguide 24. Further, it will be readily apparent to one skilled in the art that in the switched state 38 a fourth optical signal entering the preferred optical switch 20 via the lower optical waveguide 24 exits the preferred optical switch 20 via the upper optical waveguide 26.

The preferred optical switch 20 is further illustrated in FIGS. 2A and 2B. Preferably, the lower and upper optical waveguides, 24 and 26, comprise a doped material. The doped material comprises an electron carrier concentration, which meets two criteria. First, the electron carrier concentration is of a sufficient concentration for providing at least high resistance conductivity. Second, the electron carrier concentration is below a level which produces an unacceptable optical absorption. The lower and upper optical waveguides, 24 and 26, comprising the doped material consequently comprise first and second conducting elements, respectively. Alternatively, the first and second conducting elements are coupled to the lower and upper optical waveguides, 24 and 26, but are separate from the lower and upper optical waveguides, 24 and 26. Further alternatively, the first conducting element is coupled to the lower optical waveguide 24 but separate from the lower optical waveguide 24 while the second conducting element comprises the doped material of the upper optical waveguide 26.

FIG. 2A illustrates the preferred optical switch 20 in the non-switched state 34. In the non-switched state 34, a first electrical bias between the first and second conducting elements produces a first gap 42 between the lower and upper optical waveguides, 24 and 26, which is sufficiently wide to prevent optical coupling between the lower and upper optical waveguides, 24 and 26. Thus, the first optical signal 36 enters and exits the preferred optical switch 20 via the upper optical waveguide 26. Preferably, the first electrical bias is a zero electrical bias.

FIG. 2B illustrates the preferred optical switch 20 in the switched state 38. In the switched state 38, a second electrical bias between the first and second conducting elements produces a second gap 44 between the lower and upper optical waveguides, 24 and 26, which allows evanescent coupling between the lower and upper optical waveguides, 24 and 26. Thus, the second optical signal 40 enters the upper optical waveguide 26, evanescently couples across the second gap 44, and exits the preferred optical switch 20 via the lower optical waveguide 26.

Preferably, the preferred optical switch 20 operates above about a 1,200 nm wavelength. More preferably, the preferred optical switch operates in a 1,300 nm wavelength band or a 1,550 nm wavelength band. For the preferred optical switch 20 operating above about the 1,200 nm wavelength, the doped material preferably comprises doped silicon. Since silicon has a high index of refraction, approximately 3.6 for the 1,550 nm wavelength band, the doped silicon forms a highly confining waveguide. More preferably, the doped material comprises doped single crystal silicon. Alternatively, the doped material comprises doped poly-silicon.

Considering the upper optical waveguide 26 comprising the doped single crystal silicon with an electron carrier concentration of $10^{16}$ cm$^{-3}$ shows that the criteria of acceptable conductivity and acceptable optical absorption are met. If the upper optical waveguide 26 has a 2 µm×2 µm cross-section and a 10 mm length, it will have a resistance of 25 MΩ and an optical absorption of 0.11 db, both of which are acceptable for the preferred optical switch 20.

Further alternatively, the preferred optical switch 20 operates below the 1,200 nm wavelength, for example, in an 850 nm wavelength band. For the preferred optical switch 20 operating below the 1,200 nm wavelength, the doped material preferably comprises doped silicon dioxide. Since silicon dioxide has an index of refraction of proximately 1.5, the doped silicon dioxide forms a weakly confining optical waveguide.

Preferably, the preferred optical switch 20 of the present invention is fabricated using semiconductor fabrication techniques including thin film deposition, thin film etching, and ion implantation.

The lower and upper optical waveguides, 24 and 26, of the preferred optical switch 20 in the non-switched state 34 are further illustrated in FIG. 3A. The lower optical waveguide 24 lies parallel to the upper optical waveguide 26 along the coupling length 29. The lower optical waveguide 24 lies skew to the upper optical waveguide 26 outside of the coupling length 29. In other words, the input and output lengths, 31 and 33, of the lower optical waveguide 24 lie skew to the upper optical waveguide 26.

Preferably, the lower optical waveguide 24 has a first cross-section of 2 µm by 2 µm. Preferably, the coupling length 29 is 0.25 mm. Preferably, the upper optical waveguide 26 has a second cross-section of 2 μm by 2 μm. Preferably, the first gap 42 is 0.05 μm for coupling and 0.5 μm for non-coupling. Alternatively, the first and second cross-sections, the coupling length 29, and the first gap 42 are of different dimensions.

The first optical signal 38 within the preferred optical coupler 20 in the non-switched state 34 is illustrated graphically in FIG. 3B. Since the first gap 42 is greater than an evanescent coupling gap, the first optical signal 38 traverses the preferred optical switch 20 within the upper optical waveguide 26, which is at a height H relative to the lower optical waveguide 24.

The lower and upper optical waveguides, 24 and 26, of the preferred optical switch 20 in the switched state 38 are further illustrated in FIG. 3C. In the switched state 38, the second electrical bias has moved the upper optical waveguide 26 towards the lower optical waveguide 24 so that the lower and upper optical waveguides, 24 and 26, are separated by the second gap 44.

The second optical signal 40 within the preferred optical coupler 20 in the switched state 38 is illustrated graphically in FIG. 3D. Since the second gap 42 produces evanescent coupling between the lower and upper optical waveguides, 24 and 26, the second optical signal 40 travels to proximately a mid-point of the upper optical waveguide 26 and then evanescently couples to the lower optical waveguide 24. The second optical signal 40 then exits the preferred optical switch 20 via the lower optical waveguide 26.

Figure 4:
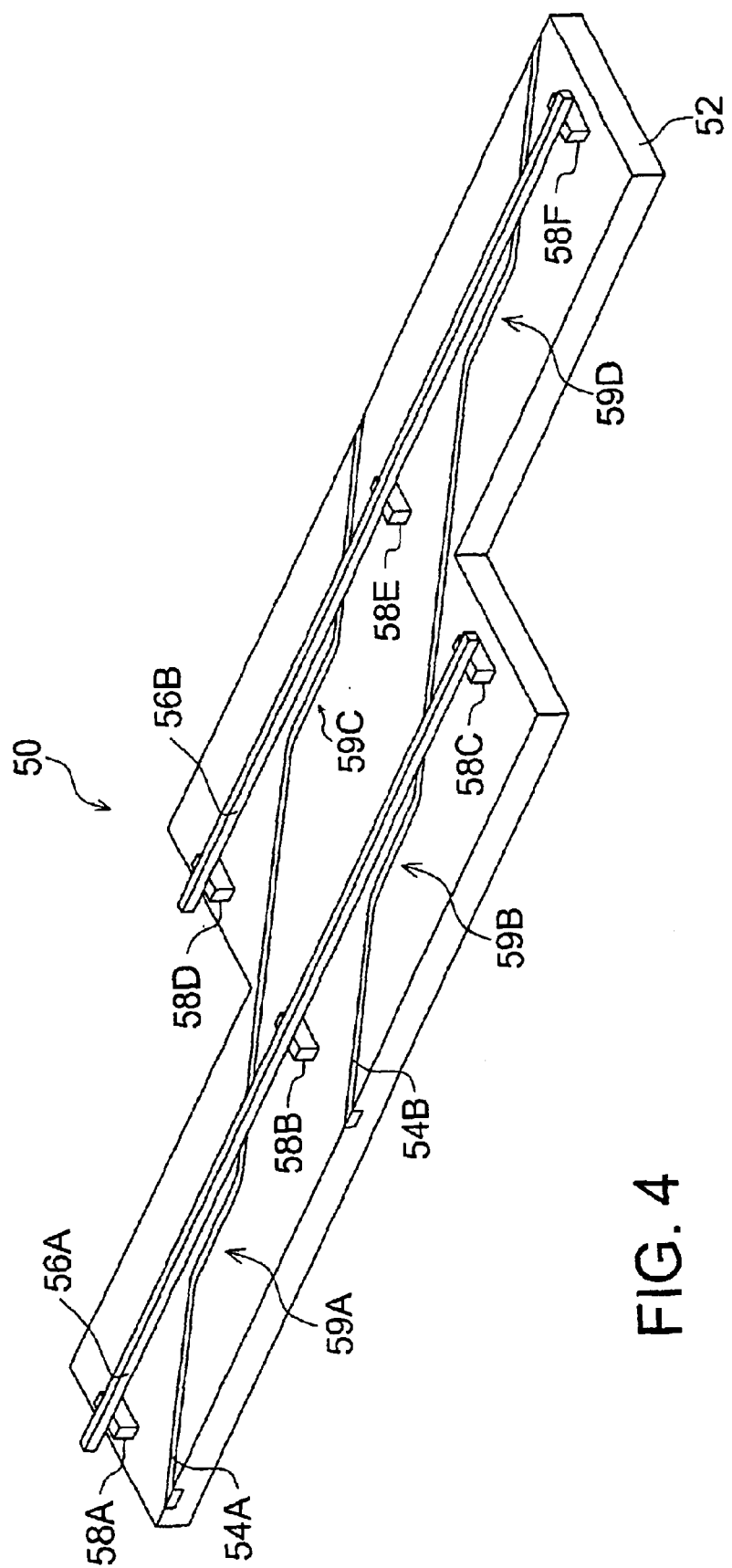
FIG. 4 illustrates a two-by-two optical switch of the present invention.

A two-by-two optical switch of the present invention is illustrated in FIG. 4. The two-by-two optical switch 50 comprises a first alternative substrate 52, first and second alternative lower optical waveguides, 54A and 54B, first and second alternative upper optical waveguides, 56A and 56B, and third through eighth support structures, 58A through 58F. The first alternative upper optical waveguide 56A is suspended above the first alternative substrate 52 by the third, fourth, and fifth support structures, 58A, 58B, and 58C. The second alternative upper optical waveguide 56B is suspended above the first alternative substrate 52 by the sixth, seventh, and eighth support structures, 58 D, 58E, and 58F.

The first alternative lower optical waveguide 54A and the first alternative upper optical waveguide 56A form a first alternative coupling length 59A between the third and fourth support structures, 58A and 58B. The second alternative lower optical waveguide 54B and the first alternative upper optical waveguide 56A form a second alternative coupling length 59B between the fourth and fifth support structures, 58B and 58C. The first alternative lower optical waveguide 54A and the second alternative upper optical waveguide 56B form a third alternative coupling length 59C between the fifth and sixth support structures, 58D and 58E. The second alternative lower optical waveguide 54B and the second alternative upper optical waveguide 56B form a fourth alternative coupling length 59D between the fifth and sixth support structures, 58E and 58F.

In operation, a third optical signal entering the first alternative upper optical waveguide 56A can be switched to either the first or second alternative lower optical waveguides, 54A or 54B. In operation, a fourth optical signal entering the second alternative optical upper waveguide 56B can be switched to either the first or second alternative lower optical waveguides, 54A or 54B. In operation, a fifth optical signal entering the first alternative lower optical waveguide 54A can be switched to either the first or second alternative upper optical waveguides, 56A or 56B. In operation, a sixth optical signal entering the second alternative lower optical waveguide 54B can be switched to either the first or second alternative upper optical waveguides, 56A or 56B.

Figure 5:
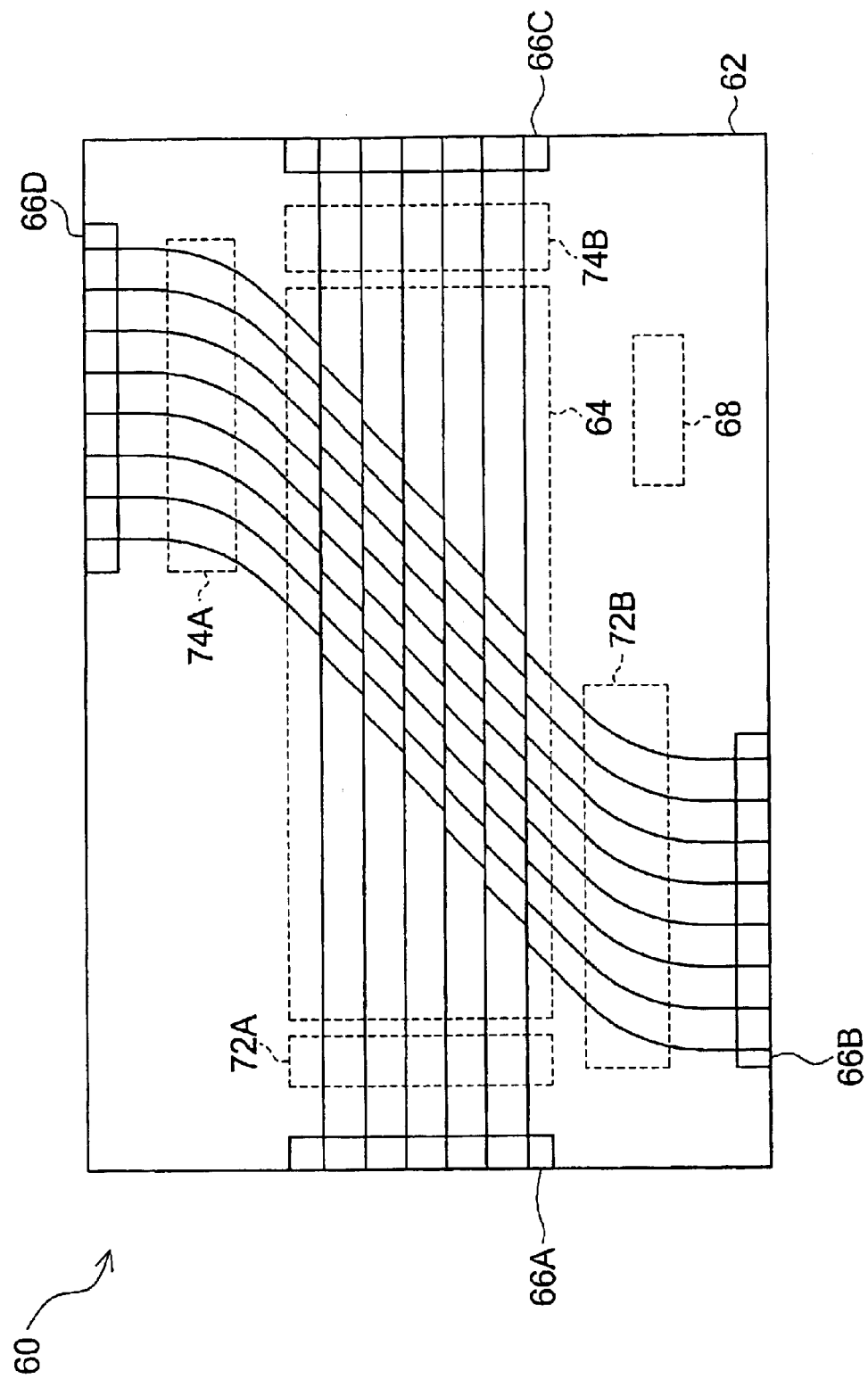
FIG. 5 illustrates a photonic MEMS assembly of the present invention.

A photonic MEMS (micro-electromechanical system) assembly of the present invention is illustrated schematically in FIG. 5. The photonic MEMS assembly 60 comprises a second alternative substrate 62, an m×n optical switch 64, first through fourth v-groove fiber coupling blocks, 66A through 66D, and an integrated circuit 68. The m×n optical switch 64 and the first through fourth v-groove fiber coupling blocks, 66A through 66D, and the integrated circuit 68 are coupled to the substrate 62. The integrated circuit 68 provides control circuitry for controlling the m×n optical switch 64.

In use, the first through fourth v-groove fiber coupling blocks, 66A through 66D, couple to first through fourth pluralities of optical fibers (not shown). Preferably in operation, the m×n optical switch operates in the 1,300 nm wavelength band or the 1,550 nm wavelength band and lower and upper optical waveguides of the m×n switch 64 comprise the doped silicon. The first and second v-groove fiber coupling blocks, 66A and 66B, are coupled to the m×n optical switch 64 by first and second input optical 25 waveguides, 72A and 72B. The m×n optical switch 64 is coupled to the third and fourth v-groove fiber coupling blocks, 66C and 66D, by first and second output optical waveguides, 74A and 74B.

Preferably, the first and second input optical waveguides, 72A and 72B, comprise adiabatic tapers. Preferably, the first and second output optical waveguides, 74A and 74B, comprise the adiabatic tapers. The adiabatic tapers provide first transitions from first single mode cores of the first and second pluralities of optical fibers to second single mode cores of the m×n optical switch 64. The adiabatic tapers also provide second transitions from the second single mode cores of the m×n optical switch 64 to third single mode cores of the third and fourth pluralities of optical fibers. Since the lower and upper optical waveguides of the m×n optical switch 64 comprise the doped silicon, the second single mode cores of the m×n optical 64 switch have a smaller cross-section than the first and third single mode cores of the first through fourth pluralities of optical fibers, the latter typically comprising silica. The adiabatic tapers employ a gradual transition, typically several hundred μm's, in order to transition from the first and second pluralities of optical fibers to the m×n optical switch 64 and to transition from the m×n optical switch 64 to the third and fourth pluralities of optical fibers.

Figure 6A:
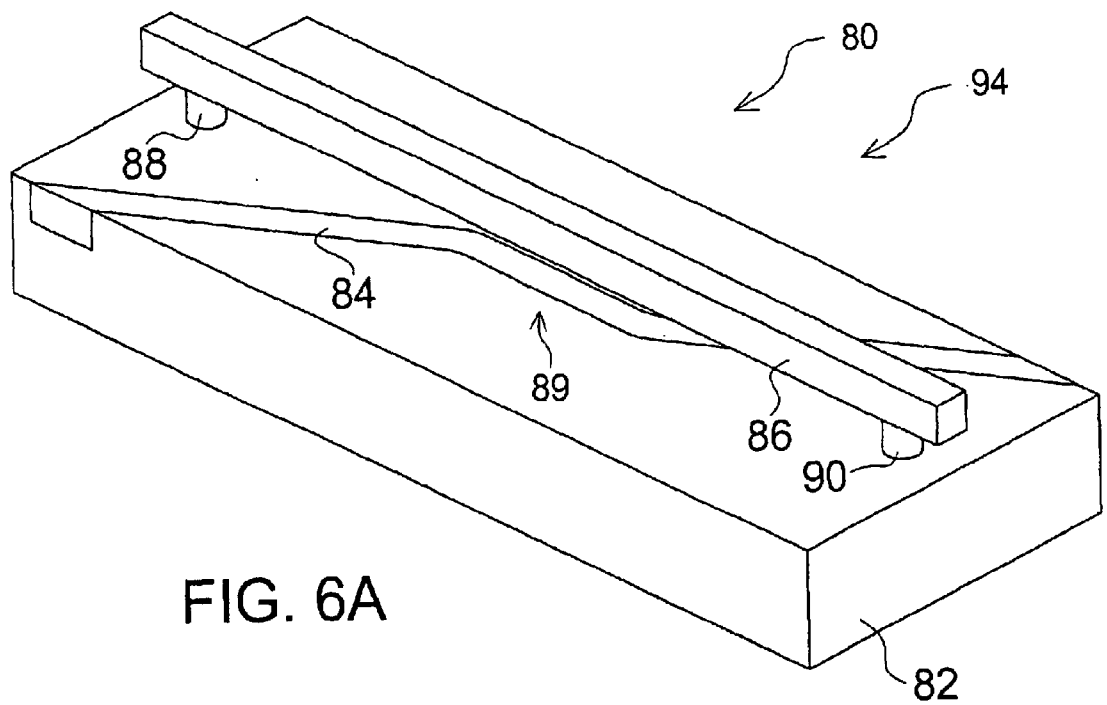
FIGS. 6A and 6B illustrate a first alternative optical switch of the present invention.
Figure 6B:
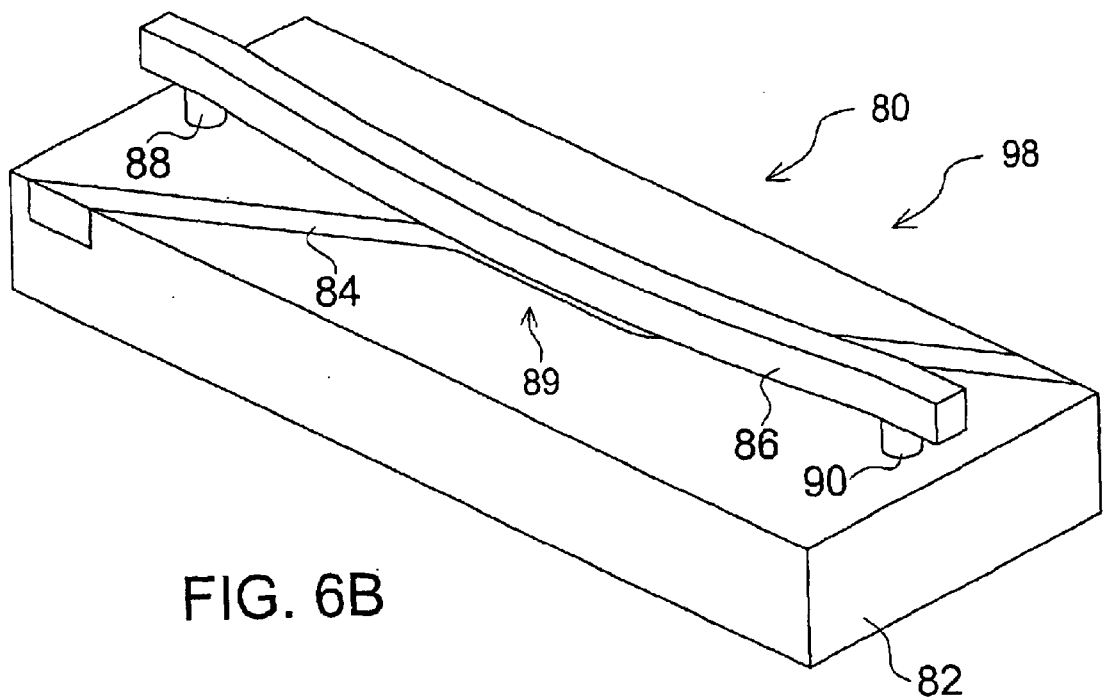

A first alternative optical switch of the present invention is illustrated in FIGS. 6A and 6B. The first alternative optical switch 80 comprises a third alternative substrate 82, a third alternative lower optical waveguide 84, a third alternative upper optical waveguide 86, and first and second posts, 80 and 90. The first and second posts couple the third alternative upper optical waveguide to the third alternative substrate 82 and also suspend the third alternative upper optical waveguide above the third alternative substrate 82. The third alternative lower and upper optical waveguides, 84 and 86, form a fifth alternative coupling length 89. FIG. 6A illustrates the first alternative optical switch 80 in a first alternative non-switched state 94. FIG. 6B illustrates the first alternative optical switch 80 in a first alternative switched state 98.

A second alternative optical switch of the present invention is illustrated in FIGS. 7A and 7B. The second alternative optical switch 100 comprises a fourth alternative substrate 102, a fourth alternative lower optical waveguide 104, a fourth alternative upper optical waveguide 106, ninth and tenth support structures, 108 and 110, and a third conducting element 112. In the second alternative optical switch 100 the fourth alternative upper optical waveguide 106 preferably comprises the doped material while the fourth alternative lower optical waveguide 104 does not. Thus, the fifth alternative optical waveguide 106 consequently comprises a fourth conducting element. Instead, the second alternative optical switch 100 employs the third conducting element 112 in conjunction with the fourth conducting element of the fourth alternative upper optical waveguide to switch between second alternative switched and non-switched states, 118 and 114.

FIG. 7A illustrates the second alternative optical switch 100 in the second alternative switched state 118. In the second alternative switched state 118, a third electrical bias applied between the third conducting element 112 and the fourth conducting element causes an optical signal entering the fourth alternative upper optical waveguide 106 of the second alternative optical switch 100 to couple to the fourth alternative lower optical waveguide 104 and exit the second alternative optical switch via the lower optical waveguide 104. Preferably, the third electrical bias is zero.

FIG. 7B illustrates the second alternative optical switch 100 in the second alternative switched state 114. In the second alternative switched state 114, a fourth electrical bias applied between the third conducting element 114 and the fourth conducting element causes an optical signal entering the fourth alternative upper optical waveguide 106 of the second alternative optical switch 100 to exit the second alternative optical switch 100 via the fourth alternative upper optical waveguide 106.

Figure 8A:
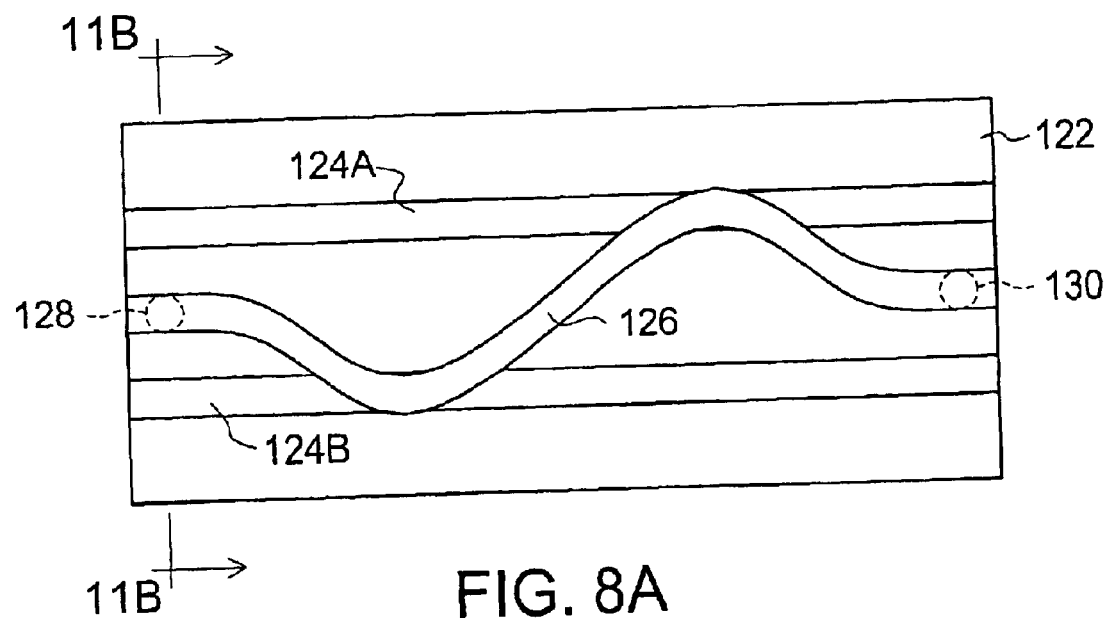
FIGS. 8A and 8B illustrate a third alternative optical coupler of the present invention.
Figure 8B:
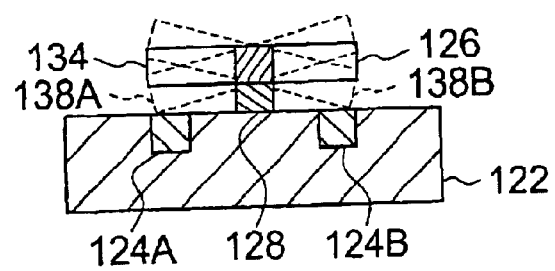

A third alternative optical switch of the present invention is illustrated in FIGS. 8A and 8B. The third alternative optical switch 120 comprises a fifth alternative substrate 122, fifth and sixth alternative lower optical waveguides, 124A and 124B, a fifth alternative upper optical waveguide 126, and third and fourth posts, 128 and 130. The fifth and sixth alternative lower optical waveguides, 124A and 124B, are coupled to the fifth alternative substrate 122. The third and fourth posts, 128 and 130, couple the sixth alternative optical waveguide 126 to the fifth alternative substrate 122. The third and fourth posts, 128 and 130, also suspend the sixth alternative optical waveguide 126 above the fifth alternative substrate.

In a third alternative non-switched state 134, the fifth alternative upper optical waveguide 126 lies parallel to the fifth alternative substrate 122. In a third alternative switched state 138A, the fifth alternative upper optical waveguide 126 rotates about an axis defined by a first intersection between the third post 128 and the fifth alternative upper optical waveguide 126 and a second intersection between the fourth post 130 and the fifth alternative upper optical waveguide 126 so that the fifth alternative upper optical waveguide 126 evanescently couples to the fifth alternative lower optical waveguide 124A. In a fourth alternative switched state 138B, the fifth alternative upper optical waveguide 126 rotates about the axis defined by the first intersection between the third post 128 and the fifth alternative upper optical waveguide 126 and the second intersection between the fourth post 130 and the fifth alternative upper optical waveguide 126 so that the fifth alternative upper optical waveguide 126 evanescently couples to the sixth alternative lower optical waveguide 124B. An advantage of the third alternative optical switch is that a torsional force needed for rotation of the fifth alternative upper optical waveguide 126 is relatively low and, consequently, the electrical bias used to produce the rotation is also relatively low.

Figure 9A:
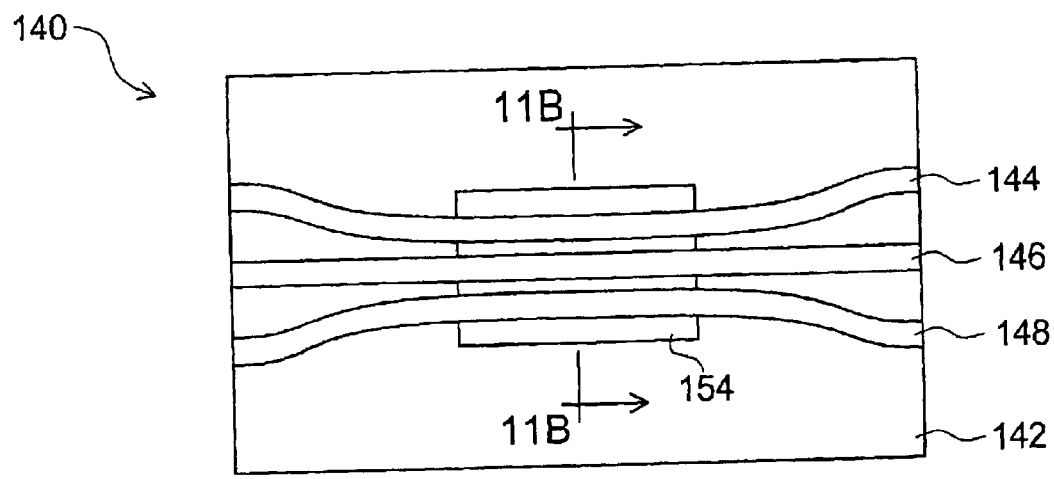
FIGS. 9A and 9B illustrate a fourth alternative optical coupler of the present invention.
Figure 9B:
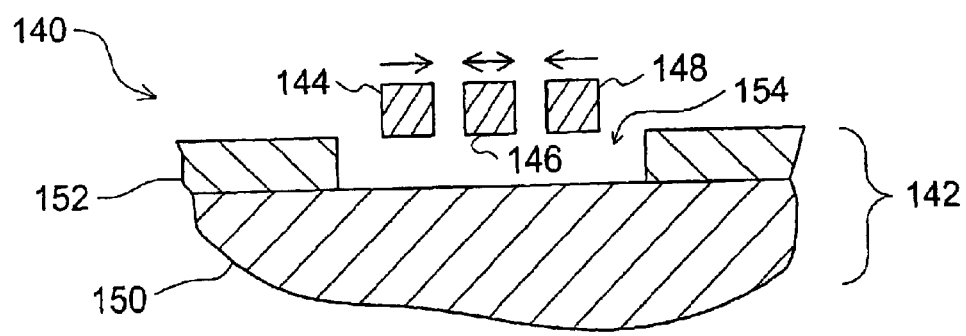

A fourth alternative optical switch of the present invention is illustrated in FIGS. 9A and 9B. The fourth alternative optical switch 140 comprises a sixth alternative substrate 142 and seventh, eighth, and ninth alternative optical waveguides, 144, 146, and 148. Preferably, the seventh, eighth, and ninth alternative optical waveguides, 144, 146, and 148, comprise the doped material so that the seventh, eighth, and ninth alternative optical waveguides, 144, 146, and 148, also comprise fourth, fifth, and sixth conducting elements. In a fourth alternative non-switched state, the fourth, fifth, and sixth conducting elements preferably have a zero electrical bias relative to each other. In a fifth alternative switched state, a fifth electrical bias causes the seventh and eighth alternative optical waveguides, 144 and 146, to evanescently couple. In a sixth alternative switched state, a sixth electrical bias causes the eighth and ninth alternative optical waveguides, 146 and 148, to evanescently couple.

A fabrication method for the fourth alternative optical switch 140 comprises first through third steps. In the first step, a silicon-on-insulator (SOI) substrate is provided. The SOI substrate comprises a base material 150, a silicon dioxide layer 152, and a silicon layer doped to an appropriate electron carrier concentration. In the second step, the silicon layer is etched to form the seventh, eighth, and ninth alternative optical waveguides, 144, 146, and 148. In the third step, a portion 154 of the silicon dioxide layer is removed in order to release the seventh, eighth, and ninth alternative optical waveguides, 144, 146, and 148.

It will be readily apparent to one skilled in the art that other various modifications may be made to the preferred embodiment without departing from the spirit and scope of the invention as defined by the appended claims.

We claim:

1. An optical switch comprising:
   a. a substrate;
   b. a first optical waveguide coupled to the substrate;
   c. a first conducting element coupled to the first optical waveguide;
   d. a second optical waveguide coupled to the substrate; and
   e. a second conducting element coupled to the second optical waveguide such that in operation a first electrical bias applied between the first and second conducting elements causes the first optical waveguide to not optically couple to the second optical waveguide and further such that in operation a second electric bias applied between the first and second conducting elements causes the first optical waveguide to optically couple to the second optical waveguide.

2. The apparatus of claim 1 wherein the first optical waveguide lies proximately parallel to the second optical waveguide along a first coupling length.

3. The apparatus of claim 2 wherein the second electrical bias moves the second optical waveguide towards the first optical waveguide.

4. The apparatus of claim 2 wherein the first optical waveguide comprises a first input length and a first output length outside of the first coupling length.

5. The apparatus of claim 4 wherein the first input length and the first output length of the first waveguide lie skew to the second optical waveguide.

6. The apparatus of claim 5 further comprising:
a. a third conducting element coupled to the first optical waveguide along a second coupling length;
b. a third optical waveguide coupled to the substrate; and
c. a fourth conducting element coupled to the third optical waveguide such that in operation a third electrical bias applied between the third and fourth conducting elements causes the first optical waveguide to not optically couple to the third optical waveguide and further such that in operation a fourth electrical bias applied between the third and fourth conducting elements causes the first optical waveguide to optically couple to the third optical waveguide.

7. The apparatus of claim 6 further comprising:
a. a fourth optical waveguide coupled to the substrate; and
b. a fifth conducting element coupled to the substrate such that in operation a fifth electrical bias between the second and fifth conducting elements causes the second optical waveguide to not optically couple to the fourth optical waveguide and further such that in operation a sixth electrical bias applied between the second and fifth conducting elements causes the second waveguide to optically couple to the fourth optical waveguide.

8. The apparatus of claim 2 wherein the first electrical bias moves the second optical waveguide away from the first optical waveguide.

9. The apparatus of claim 2 wherein first and second support structures suspend the second optical waveguide above the first optical waveguide along the coupling length.

10. The apparatus of claim 9 wherein the first and second support structures support the second optical waveguide from below the second optical waveguide.

11. The apparatus of claim 10 wherein the second optical waveguide comprises a core and a cladding and further wherein the cladding optically isolates the core from the first and second support structures.

12. The apparatus of claim 1 wherein the second optical waveguide comprises doped silicon and further wherein the second conducting element comprises the doped silicon.

13. The apparatus of claim 12 wherein the doped silicon comprises doped single crystal silicon.

14. The apparatus of claim 12 wherein the doped silicon comprises doped poly-silicon.

15. The apparatus of claim 1 wherein the first electrical bias comprises a zero electrical bias and further wherein the second electrical bias comprises a non-zero electrical bias.

16. The apparatus of claim 1 wherein the first electrical bias comprises a non-zero electrical bias and further wherein the second electrical bias comprises a zero electrical bias.

17. The apparatus of claim 1 wherein the second optical waveguide comprises doped silicon dioxide and further wherein the second conducting element comprises the doped silicon dioxide.

18. The apparatus of claim 1 wherein the first optical waveguide comprises an embedded waveguide.

19. The apparatus of claim 1 wherein the first optical waveguide comprises a ridge waveguide.

20. The apparatus of claim 1 further comprising:
a. a third optical waveguide coupled to the substrate; and
b. a third conducting element coupled to the third optical waveguide such that in operation the first electrical bias applied between the first and second conducting elements in conjunction with a third electrical bias applied between the second and third conducting elements causes the second optical waveguide to not optically couple to the third optical waveguide and further such that in operation the first electrical bias applied between the first and second conducting elements in conjunction with a fourth electrical bias applied between the second and third conducting elements causes the second optical waveguide to optically couple to the third optical waveguide.

21. The apparatus of claim 1 wherein the first optical waveguide comprises a highly confining waveguide.

22. The apparatus of claim 1 wherein the first optical waveguide comprises a weakly confining waveguide.

23. An optical switch comprising:
a. a substrate;
b. a first optical waveguide coupled to the substrate;
c. a first conducting element coupled to the first optical waveguide;
d. a second optical waveguide;
e. first and second support structures coupling the second optical waveguide to the substrate, the first and second support structures suspending the second optical waveguide above the first optical waveguide along a coupling length; and
f. a second conducting element coupled to the second optical waveguide such that in operation a first electrical bias applied between the first and second conducting elements places the second optical waveguide at a distance greater than an evanescent coupling distance from the first optical waveguide and further such that in operation a second electric bias applied between the first and second conducting elements places the second optical waveguide within the evanescent coupling distance to the first optical waveguide.

* * * * *